April 23, 1963  M. GOLDSTEIN  3,086,698
PORTABLE BLOWER
Filed March 3, 1961
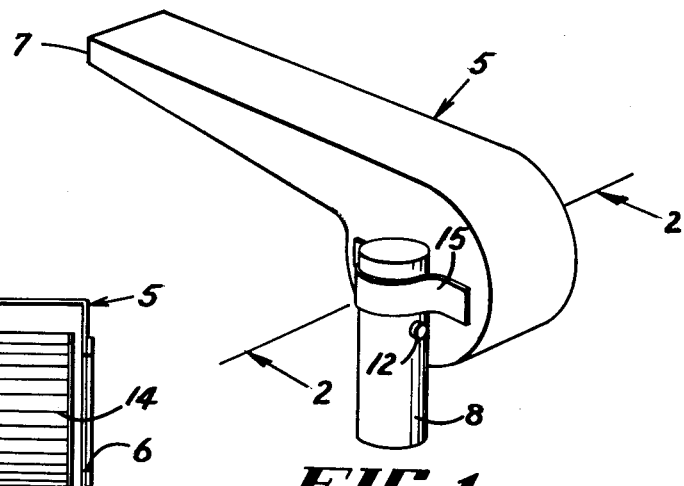
FIG. 1
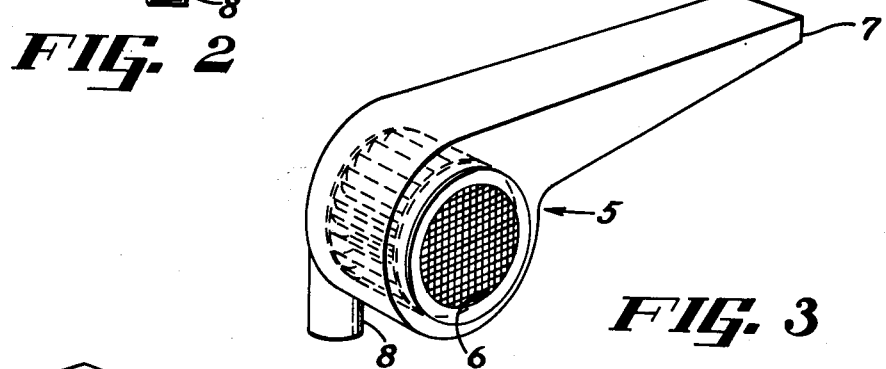
FIG. 2
FIG. 3
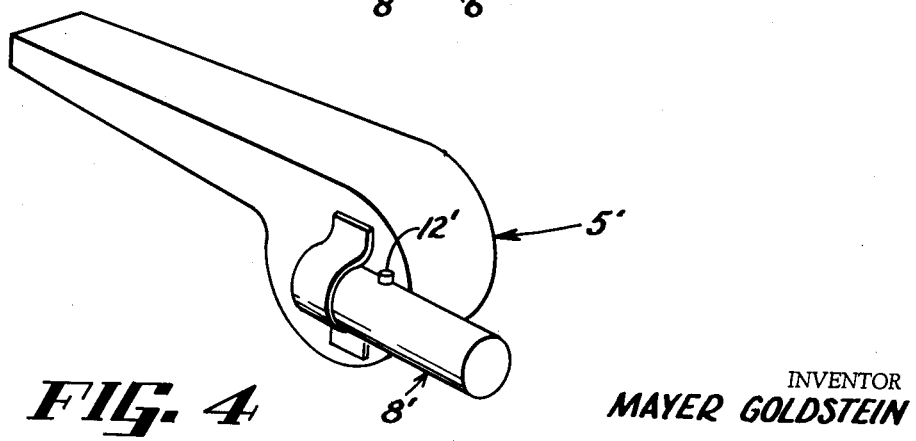
FIG. 4
INVENTOR
MAYER GOLDSTEIN

United States Patent Office 3,086,698
Patented Apr. 23, 1963

3,086,698
PORTABLE BLOWER
Mayer Goldstein, 4071 Minden Road, Memphis 17, Tenn.
Filed Mar. 3, 1961, Ser. No. 93,128
1 Claim. (Cl. 230—117)

The present invention relates to a portable power blower.

An object of the present invention is to provide a portable hand-held blower having its own power supply for use in starting charcoal barbecue fires or for removing dust from areas about precision instruments.

Another object is to provide a hand held blower that is extremely light in weight, one economical to manufacture, and one which is highly effective in action.

Other objects and uses for the portable blower of the present invention will be understood upon consideration of the following description and in view of the drawing, in which:

FIG. 1 is a perspective view,
FIG. 2 is a view on line 2—2 of FIG. 1,
FIG. 3 is another perspective view, with the blower fan shown in dotted lines, and
FIG. 4 is a perspective view of a modified form of the invention.

With reference to the drawing, the invention consists in a housing 5 having a screened inlet 6 in one side and an elongated tapering outlet 7 in another side. The housing 5 is shown in FIGS. 1 and 3 to be horizontal.

A battery case 8 projects downwardly from the side of the housing 5 opposite the inlet 6.

A pair of batteries 9 and 10, of the flashlight type, are housed within the case 8 and are in circuit with an electric motor 11 and a switch 12 mounted on the case 8. The shaft 13 of the motor 11 carries a cylindrical squirrel cage fan 14 having its open one end in registry with the screened inlet 16 in the housing 5.

The case 8 is secured to the housing 5 by a strap 15 spotwelded to the housing 5 and to the case 8.

In FIG. 4, the battery case 8' projects horizontally from the housing 5' in the direction opposite to the air outlet. All other components of the modified form of the invention being the same as described with reference to FIGS. 1, 2 and 3.

In use, the case 8, 8' serves as a handle by which the blower is easily held and, with the switch 12, 12' closed by a finger or thumb of the user, the outlet or nozzle is easy to direct to an area to receive a firm stream or blast of air, either for blowing away dust or for fanning a charcoal fire into faster combustion.

Other modifications may be made as will be found practical, within the scope of the appended claim.

What is claimed is:

A portable blower of the character described, comprising a housing having the basic configuration of a frustum of a cone and a circle when viewed from either side and the basic configuration of a rectangle when viewed from the top or bottom, and an electric motor and one or more electric batteries operating the said motor, and a cylindrical case encompassing the said electric motor and said electric batteries, the said electric motor having a rotating shaft projecting into the said housing and a squirrel cage fan secured to that end of the said shaft that projects into the said housing which is provided with a circular screened inlet and a rectangular strap encompassing approximately half of the upper end of the said cylindrical battery case to which it is spot welded, the ends of the said strap being spot welded to the said housing and a switch mounted on the side of the said battery case, the said switch being connected to the said electric batteries and the said electric motor thereby providing starting and stopping control of the said portable blower.

References Cited in the file of this patent

UNITED STATES PATENTS

| | | |
|---|---|---|
| 1,749,373 | Breuer | Mar. 4, 1930 |
| 2,135,252 | Grover | Nov. 1, 1938 |
| 2,850,228 | Rowley | Sept. 2, 1958 |

FOREIGN PATENTS

| | | |
|---|---|---|
| 6,738 | Great Britain | of 1894 |
| 17,878 | Great Britain | of 1909 |
| 795,118 | Great Britain | May 14, 1958 |